(12) United States Patent
Bigley et al.

(10) Patent No.: US 11,579,312 B1
(45) Date of Patent: Feb. 14, 2023

(54) SYSTEM FOR AIDING WATER VESSELS NEEDING TOWING

(71) Applicants: Melville Orion Bigley, Naples, FL (US); Amelia Jane Foster, Naples, FL (US); Graham Kyle Brunson, Naples, FL (US)

(72) Inventors: Melville Orion Bigley, Naples, FL (US); Amelia Jane Foster, Naples, FL (US); Graham Kyle Brunson, Naples, FL (US)

( * ) Notice: Subject to any disclaimer, the term of this patent is extended or adjusted under 35 U.S.C. 154(b) by 954 days.

(21) Appl. No.: 16/267,619

(22) Filed: Feb. 5, 2019

Related U.S. Application Data

(60) Provisional application No. 62/626,225, filed on Feb. 5, 2018.

(51) Int. Cl.
| | | |
|---|---|---|
| *G01S 19/42* | (2010.01) | |
| *G01S 19/00* | (2010.01) | |
| *B63B 49/00* | (2006.01) | |
| *G08G 3/00* | (2006.01) | |
| *G01V 1/38* | (2006.01) | |
| *G08C 17/00* | (2006.01) | |
| *B63B 21/56* | (2006.01) | |

(52) U.S. Cl.
CPC .............. *G01S 19/42* (2013.01); *G01S 19/00* (2013.01); *B63B 21/56* (2013.01); *B63B 49/00* (2013.01); *G01V 1/3835* (2013.01); *G08C 17/00* (2013.01); *G08G 3/00* (2013.01)

(58) Field of Classification Search
CPC .......... G01S 19/42; G01S 19/00; B63B 49/00
USPC ................................ 342/357.25, 357.2, 450
See application file for complete search history.

(56) References Cited

U.S. PATENT DOCUMENTS

| | | | | |
|---|---|---|---|---|
| 9,749,812 | B1 * | 8/2017 | Dulee | G06Q 40/08 |
| 10,609,508 | B1 * | 3/2020 | Dulee | G06Q 40/08 |
| 11,062,380 | B2 * | 7/2021 | Briggs | G06Q 10/0875 |
| 2012/0208489 | A1 * | 8/2012 | Jadaan | H04W 4/029 |
| | | | | 455/404.2 |
| 2020/0118444 | A1 * | 4/2020 | Wen | G06Q 10/02 |
| 2020/0342751 | A1 * | 10/2020 | Taylor | G01S 19/421 |

* cited by examiner

*Primary Examiner* — Chuong P Nguyen
(74) *Attorney, Agent, or Firm* — John Rizvi, P.A.

(57) ABSTRACT

A system for aiding water vessels needing towing. The system may comprise one or more storage machines holding instructions executable by one or more logic machines to actualize the operations of, determining an assistance requester's GPS location, determining an assistance provider's GPS location, and displaying the assistance provider's GPS location to the assistance requester. Displaying the assistance provider's GPS location to the assistance requester may include displaying a distance between the assistance requester and the assistance provider. Displaying the assistance provider's GPS location to the assistance requester may include displaying a service cost for the assistance provider's service. The assistance requester and assistance provider may be independent vessels.

1 Claim, 3 Drawing Sheets

SYSTEM FOR AIDING WATER VESSELS NEEDING TOWING

CROSS-REFERENCE TO RELATED APPLICATION

This application claims the benefit of U.S. Provisional Patent Application Ser. No. 62/626,225, filed Feb. 5, 2018, which is incorporated herein in its entirety.

FIELD OF THE INVENTION

The present invention relates generally to water vessel communication systems, and more particularly to a system for aiding water vessels needing towing.

BACKGROUND OF THE INVENTION

Sometimes, a water vessel may be in trouble. For example, a boat may malfunction while out on the water. Currently, if a water vessel needs help, an operator can send out an SOS signal, or attempt to call for help using a radio communication system.

Another way for a water vessel operator to find help is to call private companies such as BoatUS or Sea Tow, since the Coast Guard does not typically tow water vessels. These private companies may not have tow boats close by, and/or may charge a high fee for towing. It is also commonly known in boating communities that these private companies are difficult to get in touch with, and it is common for a customer to leave multiple voicemails before receiving a response.

Therefore, there is a need for a system that will provide broken down vessels with a more convenient and cheaper towing solution.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present invention is directed to a system for aiding water vessels needing towing, the system comprising one or more storage machines holding instructions executable by one or more logic machines to actualize the operations of, determining an assistance requester's GPS location, determining an assistance provider's GPS location, and displaying the assistance provider's GPS location to the assistance requester.

In another aspect, the assistance requester has been identified as requesting towing.

In another aspect, the assistance provider has been identified as providing towing services.

In another aspect, determining the GPS location includes receiving GPS data at a GPS receiver to determine a position of the UPS receiver.

In another aspect, the assistance requester and assistance provider are operators of independent water vessels.

In another aspect, displaying the assistance provider's GPS location to the assistance requester includes displaying a geographic representation of the assistance provider's location with respect to the assistance requester's location.

In another aspect, displaying the assistance provider's UPS location to the assistance requester includes displaying a distance between the assistance requester and the assistance provider.

In another aspect, displaying the assistance provider's GPS location to the assistance requester includes displaying a service cost for the assistance provider's service.

In another aspect, the operations include establishing a service request between the assistance requester and the assistance provider.

In another aspect, the operations include identifying if a service request is completed.

As another example, disclosed is a system for aiding water vessels needing towing, the system comprising one or more storage machines holding instructions executable by one or more logic machines to actualize the operations of: determining an assistance requester's GPS location; determining an assistance provider's GPS location; displaying the assistance provider's GPS location to the assistance requester; wherein the operations further include, identifying that the assistance requester is requesting towing; wherein the operations further include: automatically searching for assistance providers for the assistance requester according to a location of the assistance requester; receiving a set of parameters inputted by the assistance requester such that assistance providers are displayed to the assistance requester according to the set of parameters, wherein the set of parameters include maximum distance away, cost, and type of vessel; displaying assistance requesters to assistance providers; receiving a set of parameters inputted by the assistance provider, wherein the set of parameters include maximum towing distance and vessel type; establishing a service request upon the assistance requester selecting and hiring an assistance provider, and upon the assistance requester and assistance provider agreeing to a service request; and upon completion of a service request, receiving an input form one or both of the assistance requester and provider to indicate if a service request is completed, and receiving an evaluation rating from one or both of the service requester and service provider.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
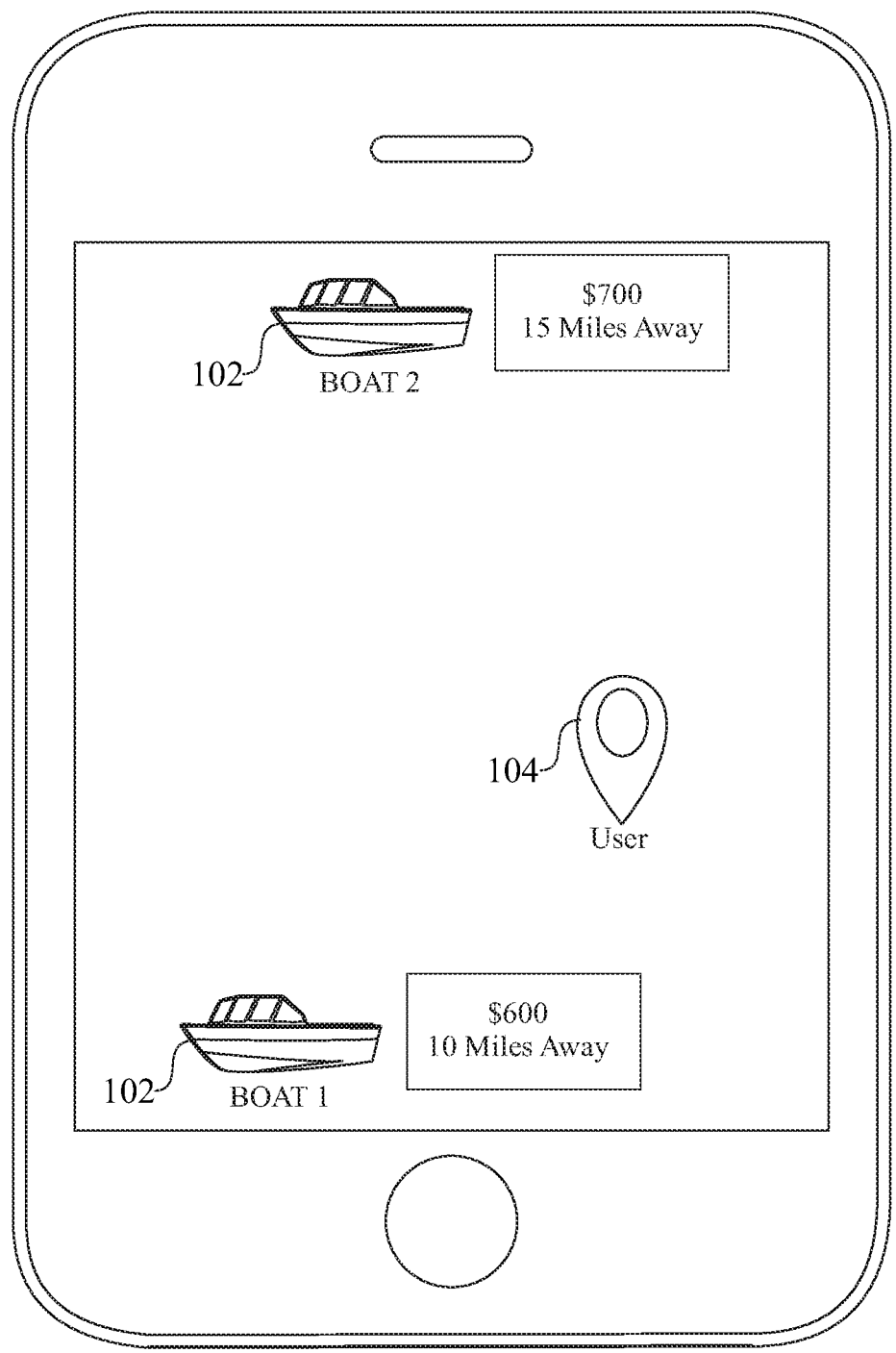
FIG. 1 presents a GUI that displays nearby vessels that provide towing services, in accordance with aspects of the present disclosure.
Figure 2:
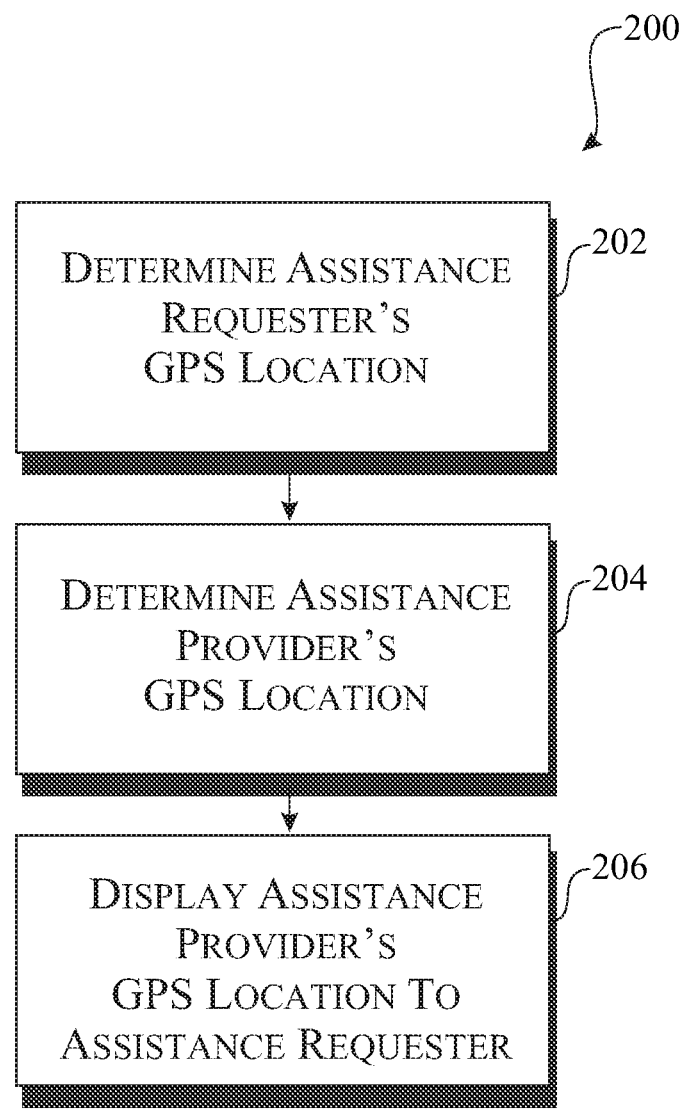
FIG. 2 presents an exemplary method of displaying an assistance provider's location to an assistance requester, in accordance with aspects of the present disclosure.
Figure 3:
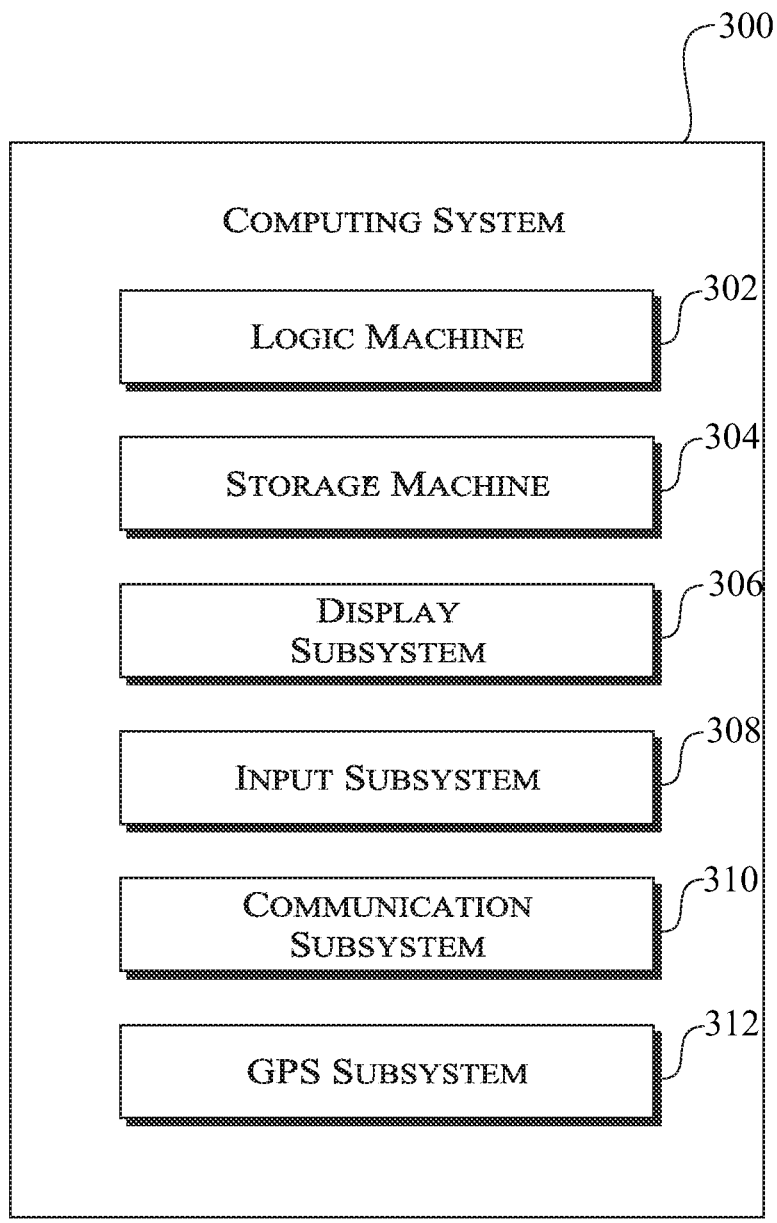
FIG. 3 schematically presents an exemplary computing system, in accordance with aspects of the present disclosure.

The present invention is directed to a system for aiding water vessels needing towing. The system may comprise one or more storage machines holding instructions executable by one or more logic machines (FIG. 3) to actualize the operations of, at 202 of method 200 (FIG. 2) determining an assistance requester's GPS location, at 204 determining an assistance provider's GPS location, and at 206 displaying the assistance provider's GPS location to the assistance requester. Displaying the assistance provider's UPS location to the assistance requester may include displaying a distance between the assistance requester and the assistance provider (FIG. 1). Displaying the assistance provider's GPS location to the assistance requester may include displaying a service cost for the assistance provider's service, as shown in FIG. 1.

For example, the illustration of FIG. 1 shows locations of one or more assistance providers 102 (e.g. boats) being displayed on an electronic device, where the locations of the assistance providers are displayed relative to an assistance requester 104 (e.g. a user). Next to each of the assistance providers 102, a cost of providing assistance (e.g. towing) is displayed. Further, a geographic distance of each assistance provider 102 relative to an assistance requester 104 may be displayed. Therefore, a user of a mobile application may be presented with nearby assistance providers 102, their location (e.g. GPS coordinates), and/or a cost of assistance (e.g. towing) for using each assistance provider 102. The assistance requester 104 and assistance provider 102 may be operators of independent water vessels.

More particularly, FIG. 1 shows two boats (Boat 1 and Boat 2) that are displayed relative to a user 104's location, Boat 1 is 10 miles away from the user and is providing services for $600. Boat 2 is 15 miles away from the user and is providing services for $700. It is to be understood that any appropriate information may be presented, and the scope of this disclosure is not limited to displaying a service cost or a distance of each of the assistance providers.

The assistance requester 104 may be identified, flagged, registered, or tagged as requesting towing. For example, an assistance requester 104 may provide a user input to the disclosed system such that the assistance requester's account is flagged, labeled, or marked as requesting towing, and the system may automatically search for assistance providers 102 for the assistance requester 104 according to a location of the assistance requester. A set of parameters may be inputted by the assistance requester 104 such assistance providers 102 are presented or displayed to the assistance requester 104 according to the parameters (e.g. maximum distance away, cost, type of vessel, etc.).

The system may display assistance requesters 104 to assistance providers 102, likewise, since assistance providers 102 (i.e. provider users) may use a mobile application or device that displays nearby assistance requesters 104. Likewise, an assistance provider 102 may identify, flag, register, or tag themselves as providing towing services (e.g. according to an appropriate user input, such as selecting an option through an electronic device). Assistance providers may select various parameters for services they provide, such as a maximum towing distance, or vessel types that they are able to tow.

It is to be understood that any appropriate device may be used to allow a user to enter inputs such that the herein described tasks or operations are executed. Such devices may be smart phones, tablet PCs, laptops, or desktop computers.

Determining the GPS location may include receiving GPS data at a GPS receiver to determine a position of the GPS receiver. However, any appropriate system may be included to determine a location of any of the herein mentioned users. For example, a location of a user may be registered in the system according to a manual input of geographic coordinates by either or both the assistance requester or assistance provider.

The operations may further include establishing a service request between the assistance requester and the assistance provider. Further, the operations may include identifying if a service request is completed. For example, a service request may be established upon an assistance requester selecting and hiring an assistance provider. Additionally or alternatively, both an assistance requester and provider may be required to agree to a service request. Upon completion of a service request, one or both of the assistance requester and provider may be prompted to indicate if a service request is completed. Further, a rating or evaluation of the service request may be provided by any of the users.

In some embodiments the methods, tasks, processes, and/or operations described above may be effected, executed, actualized, and/or carried out by a computing system including a tangible computer-readable storage medium, also described herein as a storage machine, that holds machine-readable instructions executable by a logic machine (i.e. a processor or programmable control device) to effect, execute, actualize, carry out, provide, implement, perform, and/or enact the above described methods, processes, operations, and/or tasks. For example, a suitable computing system may be computing system 300 shown in FIG. 3. When such methods, operations, and/or processes are implemented, the state of the storage machine 304 may be changed to hold different data. For example, the storage machine 304 may include memory devices such as various hard disk drives, CD, or DVD devices. The logic machine 302 may execute machine-readable instructions via one or more physical information and/or logic processing devices. For example, the logic machine 302 may be configured to execute instructions to perform tasks for a computer program. The logic machine 302 may include one or more processors to execute the machine-readable instructions. The computing system 300 may include a display subsystem 306 to display a graphical user interface (GUI) or any visual element of the methods or processes described above. For example, the display subsystem 306, storage machine 304, and logic machine 302 may be integrated such that the above method may be executed while visual elements of the disclosed system and/or method are displayed on a display screen for user consumption. The computing system 300 may include an input subsystem 308 that receives user input. The input subsystem 308 may be configured to connect to and receive input from devices such as a mouse, keyboard or gaming controller. For example, a user input may indicate a request that a certain task is to be executed by the computing system 300, such as requesting the computing system 300 to display any of the above described information, or requesting that the user input updates or modifies existing stored information for processing. A communication subsystem 310 may allow the methods described above to be executed or provided over a computer network. For example, the communication subsystem 310 may be configured to enable the computing system 300 to communicate with a plurality of personal computing devices. The communication subsystem 310 may include wired and/or wireless communication devices to facilitate networked communication. As a non-limiting example, the computing system 300 may include a global positioning system (GPS) module 312 that includes one or more GPS receivers for determining a location of one or more electronic devices (e.g. a smart phone). The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for aiding water vessels needing towing, the system comprising one or more storage machines holding instructions executable by one or more logic machines to actualize the operations of:
   determining an assistance requester's GPS location of the water vessel needing towing;
   determining an assistance provider's GPS location of the water vessel needing towing;
   displaying the assistance provider's GPS location to the assistance requester;
   wherein the operations further include, identifying that the assistance requester is requesting towing;
   wherein the operations further include:
   automatically searching for assistance providers for the assistance requester according to a location of the assistance requester;
   receiving a set of parameters inputted by the assistance requester such that assistance providers are displayed to the assistance requester according to the set of parameters, wherein the set of parameters include maximum distance away, cost, and type of vessel;
   displaying assistance requesters to assistance providers;
   receiving a set of parameters inputted by the assistance provider, wherein the set of parameters include maximum towing distance and vessel type;
   establishing a service request upon the assistance requester selecting and hiring an assistance provider, and upon the assistance requester and assistance provider agreeing to a service request; and
   upon completion of a service request, receiving an input form one or both of the assistance requester and provider to indicate if a service request is completed, and receiving an evaluation rating from one or both of the service requester and service provider.

* * * * *